US008690198B2

(12) United States Patent
Saber et al.

(10) Patent No.: US 8,690,198 B2
(45) Date of Patent: Apr. 8, 2014

(54) LOCKING DEVICE FOR CONNECTORS

(71) Applicants: Michael John Saber, Carmel, IN (US); Joseph Edward Parrish, Goldsboro, NC (US)

(72) Inventors: Michael John Saber, Carmel, IN (US); Joseph Edward Parrish, Goldsboro, NC (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 13/708,442

(22) Filed: Dec. 7, 2012

(65) Prior Publication Data

US 2013/0095682 A1 Apr. 18, 2013

Related U.S. Application Data

(63) Continuation of application No. 12/772,419, filed on May 3, 2010, now abandoned.

(51) Int. Cl.
*F16L 37/23* (2006.01)

(52) U.S. Cl.
USPC ............................ 285/277; 285/276; 285/316

(58) Field of Classification Search
USPC .......................... 285/276, 277, 314, 315, 316
See application file for complete search history.

(56) References Cited

U.S. PATENT DOCUMENTS

| | | | |
|---|---|---|---|
| 3,314,694 | A | 4/1967 | Foccou |
| 3,351,359 | A | 11/1967 | Ferraris |
| 5,255,714 | A | 10/1993 | Mullins |
| 6,779,778 | B2 | 8/2004 | Kuwabara |
| 6,908,118 | B2 | 6/2005 | Fumioka |

*Primary Examiner* — James Hewitt
(74) *Attorney, Agent, or Firm* — King & Spalding LLP

(57) ABSTRACT

A connector for high amperage, AC or DC connection includes a plug and a receptacle configured to securely mate and lock with each other. Connector receptacles include a locking mechanism having a sleeve unit having a plurality of openings configured to receive a plurality of alignment members, a control unit in communication with the alignment members, and at least one extension member coupling the sleeve unit to the control unit. The control unit is configured to bias the alignment members to engage a groove in a plug in a locked position. Upon rotation of the control unit, the control unit engages the sleeve unit and allows the alignment members to freely move, thus allowing a user to connect or disconnect the plug from the receptacle.

20 Claims, 9 Drawing Sheets

LOCKING DEVICE FOR CONNECTORS

CROSS-REFERENCE TO RELATED APPLICATIONS

This patent application is a continuation of and claims priority under U.S.C. §120 to U.S. patent application Ser. No. 12/772,419, entitled "Locking Device For Connectors," filed May 3, 2010, now abandoned, the entirety of which is incorporated by reference herein.

TECHNICAL FIELD

The present invention relates generally to a locking device. More particularly, the present invention is directed to an automatic locking device for single pole connectors.

BACKGROUND OF THE INVENTION

Heavy duty connectors include receptacles and plugs for high power cable connections and may be used, for example, in oil drilling applications. For instance, heavy duty connectors can safely carry power from generators to switch gear, selective catalytic reduction (SCR) packages, or traction motors, including mud pumps, draw works, rotary tables, cement pumps and other offshore applications. Conventionally, once a high power plug is inserted into a receptacle, an external "U" shaped clevis pin may be used to lock the plug in place and eliminate the possibility of accidental disengagement. Typically, the clevis pin is vertically inserted into a set of holes in the upper and lower portion the receptacle and seated within a groove molded in the plug to positively lock the plug within the receptacle. However, the process of inserting the clevis pin into the receptacle to lock the plug in place may be cumbersome for the user because the clevis pin must be aligned with the set of holes in the upper and lower portion of the receptacle as well as the molded groove in the plug.

Therefore, a need exists for a receptacle having an improved locking mechanism that is easier to use than conventional receptacles.

SUMMARY OF THE INVENTION

The present invention attempts to satisfy the above-described need by providing a locking mechanism for automatically securing a plug within a receptacle. Generally, the locking mechanism is coupled to a plug receiving end of a connector receptacle. The locking mechanism includes a sleeve unit having openings configured to receive alignment members, and a control unit coupled to the sleeve unit by extension members. In certain aspects, the extension members are extension springs.

The alignment members are configured to engage and lock the plug once inserted in the receptacle. The control unit biases the alignment members in a locked position. Upon rotation of the control unit, in an unlocked position, the alignment members are free to move into grooves in the control unit, thus allowing a user to connect and disconnect the plug from the receptacle. The extension members bias some of the alignment members towards the locked position, thus once the plug is inserted into the receptacle, the alignment members automatically lock the plug into place by shifting into the locked position.

In certain aspects, the sleeve unit includes a push sleeve and a retainer. The retainer can include notches configured to engage a control unit when the locking mechanism is in the unlocked position. The retainer can be coupled to one end of the extension members.

In certain aspects, the control unit includes a spinner, locking ring, and a control wheel. The spinner can be coupled a second end of the extension members. The locking ring includes protrusions that bias the alignment members to a locked position, and grooves that engage the alignment members when in the unlocked position. In certain aspects, the locking ring includes notches that engage the notches on the retainer in the unlocked position. Upon rotation of the control wheel, the locking ring engages the retainer.

In certain aspects, the extension members are extension springs. In the unlocked position, the extension members are extended. Alternating alignment members may be exposed to tension from the extension members, and the tension forces the alignment members towards the locked position and allow the extension members to return to their original state.

These and other aspects, objects, features and embodiments of the present invention will become apparent to those skilled in the art upon consideration of the following detailed description of illustrated embodiments exemplifying the best mode for carrying out the invention as presently perceived.

DETAILED DESCRIPTION OF THE INVENTION

Figure 1A:
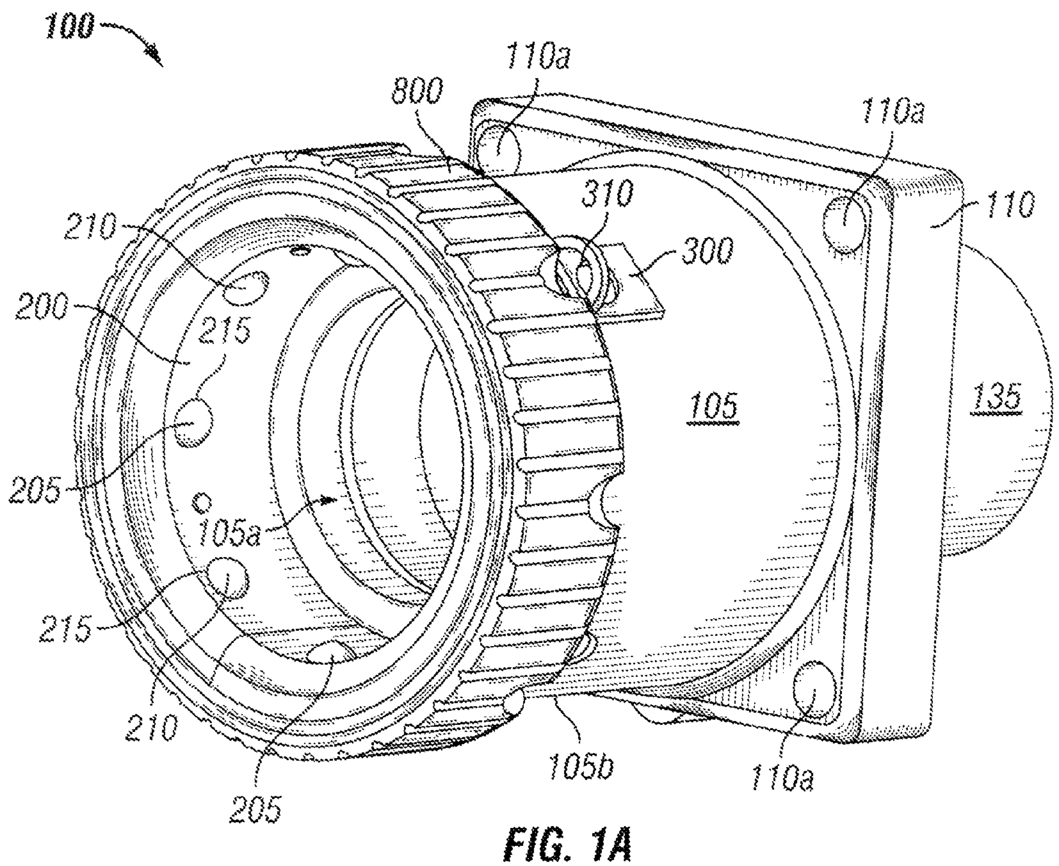
FIG. 1A is a perspective view of a receptacle, according to an exemplary embodiment

The present invention relates to connectors having an improved locking mechanism for securing a plug within a receptacle. The locking device described herein allows positive locking of a plug to a receptacle. The locking device can generally lock the plug in the same position each time with added strength over conventional locking devices. The locking device also can allow automatic positioning and locking of the plug to the receptacle.

The invention may be better understood by reading the following description of non-limitative, exemplary embodiments with reference to the attached drawings wherein like parts of each of the figures are identified by the same reference characters.

FIG. 1A is a perspective view of a connector receptacle 100, showing components visible from an exterior, according to an exemplary embodiment. The receptacle 100 includes a cylindrical housing 105 having a cavity 105*a* therein, and configured for receiving a connector plug (not shown). The receptacle 100 includes a flange 110 extending orthogonally from the housing 105. The flange 110 includes holes 110*a* for receiving fasteners (not shown) for mounting the receptacle 100 to a wall or other surface (not shown).

A bracket 300 is coupled to an exterior of the housing 105. The bracket 300 includes an opening 315 configured to accept a securing mechanism (not shown), such as a lock. The bracket 300 prevents a user from accidentally unlocking the plug from the receptacle 100.

The receptacle 100 includes a push sleeve 200 partially positioned within the cavity 105*a* and coupled to an interior of the plug receiving end 105*b* of the housing 105. The push sleeve 200 includes multiple alignment members 205, 210 positioned within apertures 215 in the push sleeve 200. The alignment members 205, 210 align and hold the plug in a locked position.

The receptacle 100 also includes an insert assembly housing 135 positioned within the cavity 105*a* of the housing 105. The insert assembly housing 135 houses an insert assembly (not shown) configured to mate with a connector plug. The receptacle 100 further includes a control wheel 800 coupled to an exterior of the push sleeve 200. The control wheel 800 is movable between a first position and a second position, and allows a user to disengage a plug from the receptacle 100 upon rotation.

Figure 1B:
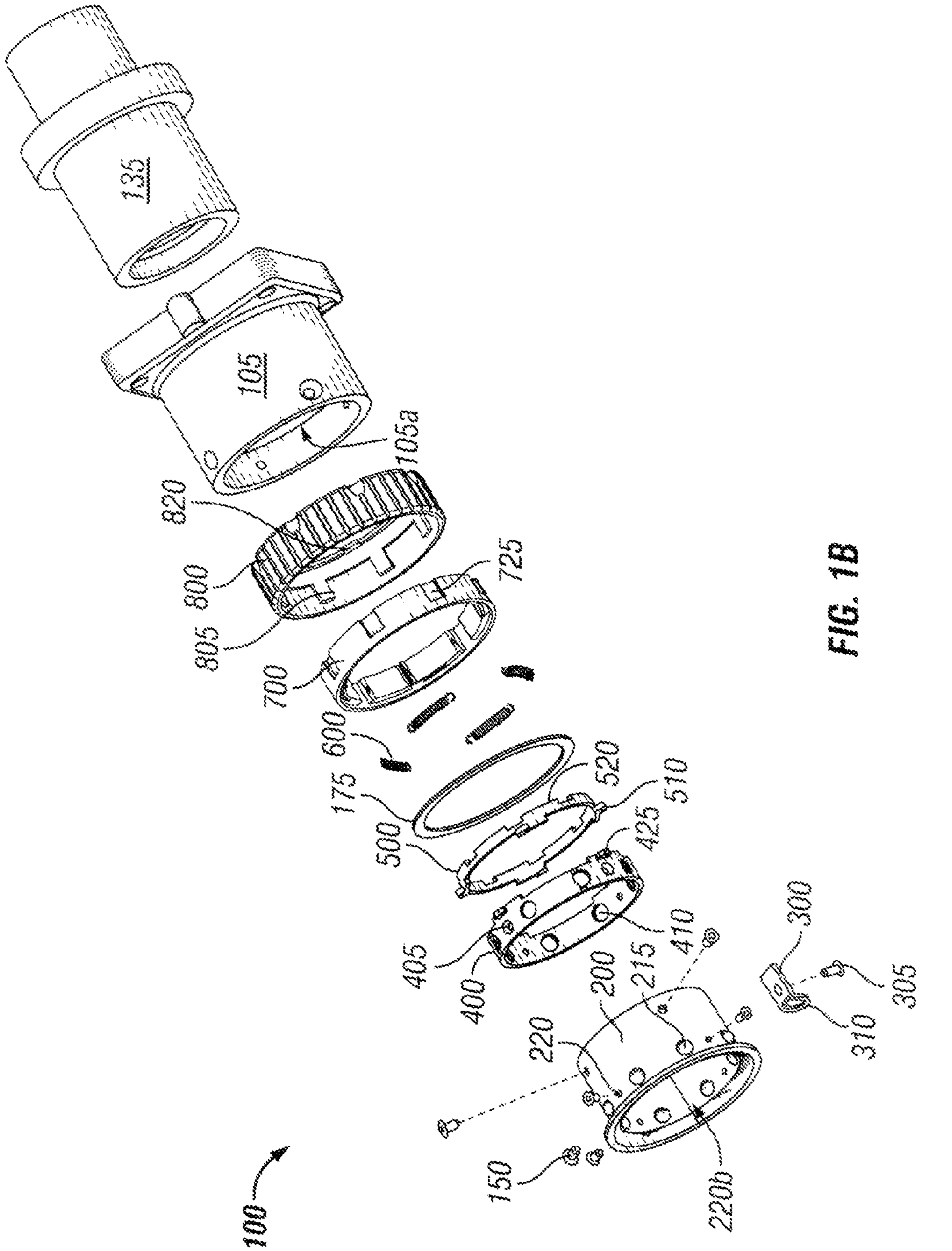
FIG. 1B is an exploded view of the receptacle shown in FIG. 1A, according to an exemplary embodiment.
Figure 1C:
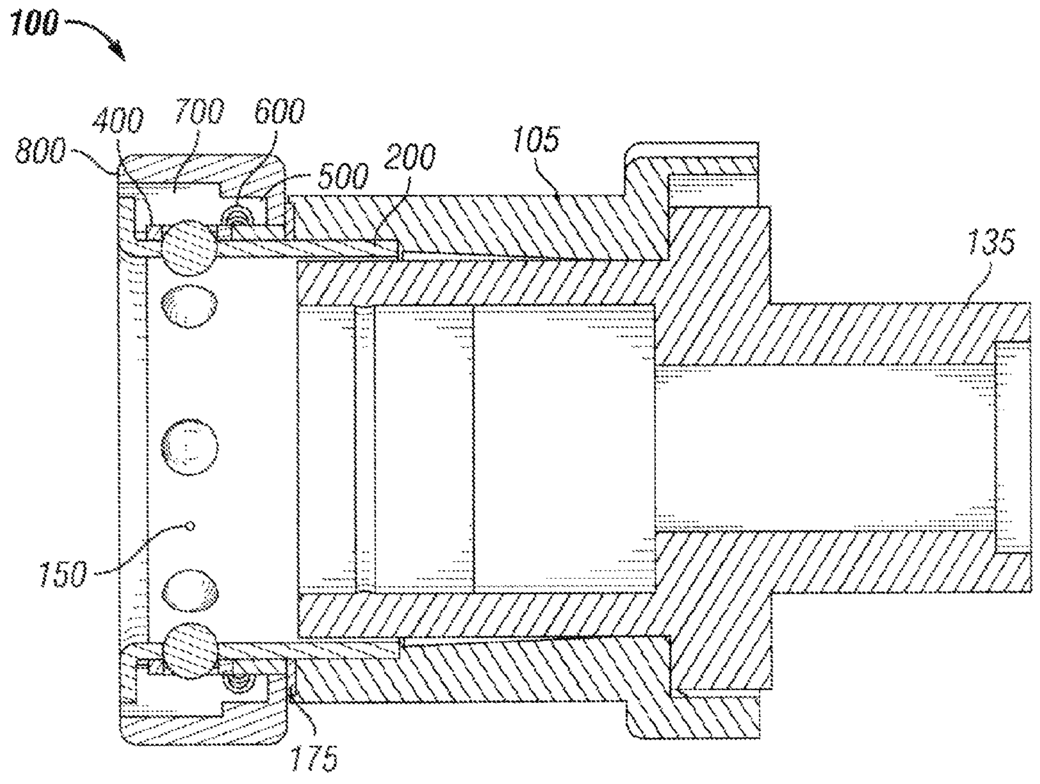
FIG. 1C is a side cross-sectional view of the receptacle shown in FIG. 1A, according to an exemplary embodiment.

FIG. 1B is an exploded view showing all of the components of the connector receptacle 100, and FIG. 1C is a side cross-sectional view of the assembled connector receptacle 100, according to an exemplary embodiment. The receptacle 100 includes the housing 105 having the cavity 105*a* therein, and the push sleeve 200 positioned within the cavity 105*a*. The push sleeve 200 includes a cavity 220*b*. The insert assembly housing 135 is positioned within the cavity 220*b* and extends into the cavity 105*a* of the receptacle housing 105.

The receptacle 100 includes a circular retainer 400 having a plurality of apertures 410 corresponding to and aligned with the apertures 215 on the push sleeve 200 when the retainer 400 is coupled to the push sleeve 200. In certain embodiments, the retainer 400 may be coupled to the push sleeve 200 via screws 150 extending from holes 405 on the retainer 400 through holes 220 on the push sleeve 200. The receptacle 100 also includes a circular spinner 500. The spinner 500 is movably coupled to the retainer 400 by springs 600 extending from holes 425 on the retainer 400 to holes 510 on the spinner 500.

The receptacle 100 further includes a locking ring 700 coupled to the control wheel 800. The locking ring 700 includes notches 725 on an exterior and configured to receive protrusions 805 positioned on an interior of the control wheel 800. The spinner 500 is also coupled to the control wheel 800. The spinner 500 is positioned within the control wheel 800, and includes notches 520 configured to engage protrusions 820 of the control wheel 800. As a result, the control wheel 800, the spinner 500, and the locking ring 700 are partially rotatable about the remaining components of the receptacle 100 by way of the springs 600.

The receptacle 100 also includes a gasket 175 positioned between the control wheel 800 and the plug receiving end 105*b* of the housing 105. The receptacle 100 further includes the bracket 300 coupled to an exterior of the housing 105 via screw 305. The bracket 300 includes an opening 310 configured to accept a securing mechanism (not shown).

Figure 2:
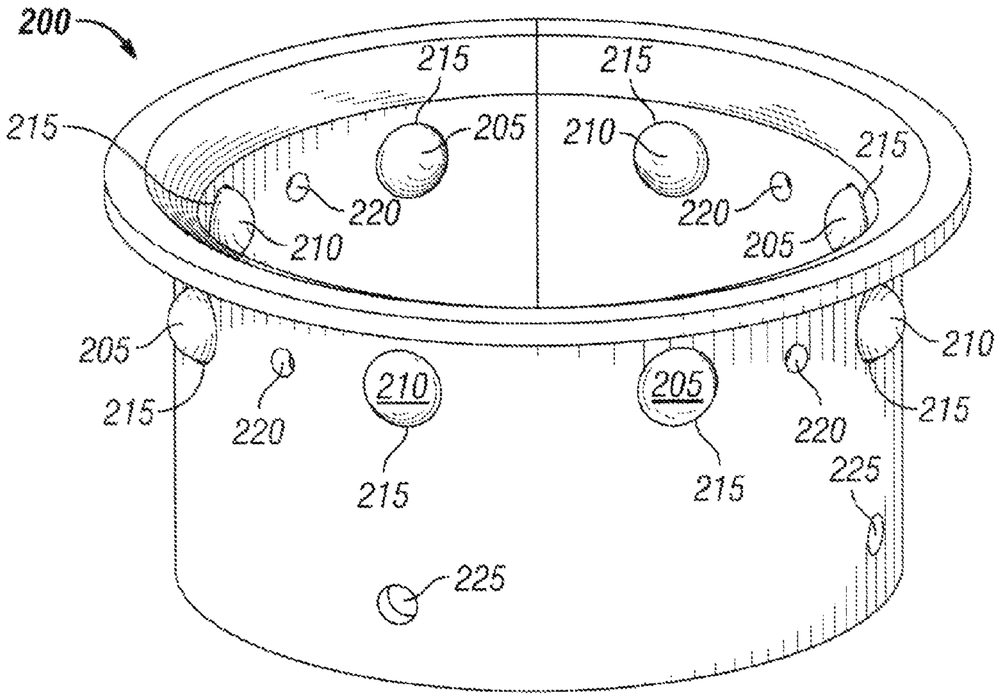
FIG. 2 is a perspective view of a push sleeve, according to an exemplary embodiment.

FIG. 2 is a perspective view of a bell-shaped push sleeve 200, according to an exemplary embodiment. The push sleeve 200 may be constructed from a rigid material, such as stainless steel. In certain exemplary embodiments, the material is corrosion-resistant. The push sleeve 200 includes four free-moving alignment members 205 and four alignment members 210 under spring tension (when assembled with remaining components of the receptacle 100). The alignment members 205, 210 are positioned within apertures 215 in the push sleeve 200. The alignment members 205, 210 are spherical-shaped and constructed from any conductive material. In certain embodiments, the alignment members 205, 210 are fabricated from a corrosion-resistant material. In certain exemplary embodiments, alignment members 205, 210 are constructed from stainless steel. In certain alternative embodiments, three free-moving alignment members 205 and three alignment members 210 under spring tension may be included. In certain alternative embodiments, free-moving alignment members 205 may not be included. The number of alignment members 205, 210 present in the push sleeve 200 may vary from connector to connector and one having ordinary skill in the art can recognize a suitable number of alignment members 205, 210 to include.

The push sleeve 200 also includes four holes 220 configured to receive fastening means (not shown) for coupling to a retainer (not shown), and four holes 225 configured to receive fastening means (not shown) for coupling to a receptacle housing 105.

Figure 3:
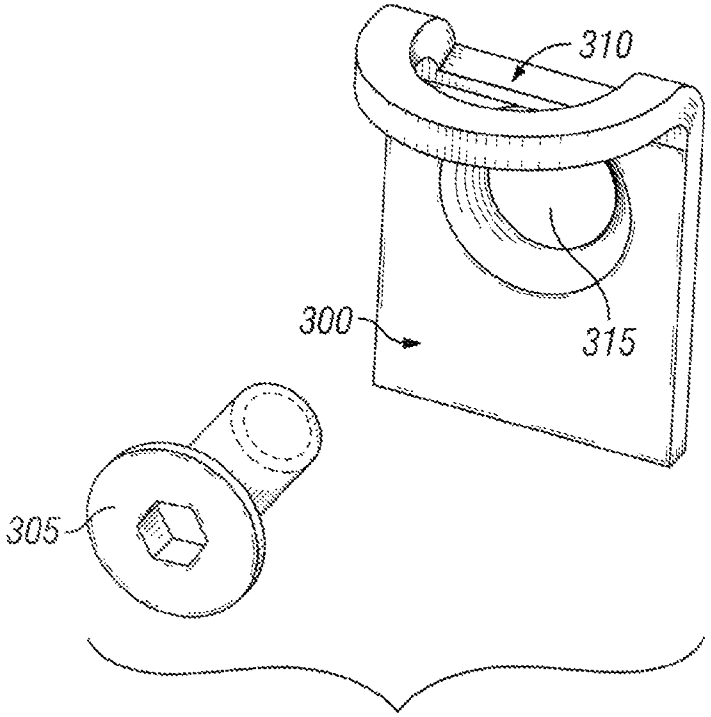
FIG. 3 is a perspective view of a bracket, according to an exemplary embodiment.

FIG. 3 is a perspective view of a bracket 300 and a fastening screw 305, according to an exemplary embodiment. The bracket 300 is L-shaped and includes an aperture 310 configured to receive a lockout device, such as a lock (not shown), and an aperture 315 configured to receive the screw 305. The bracket 300 may be mounted to an exterior of a connector housing (not shown).

Figure 4:
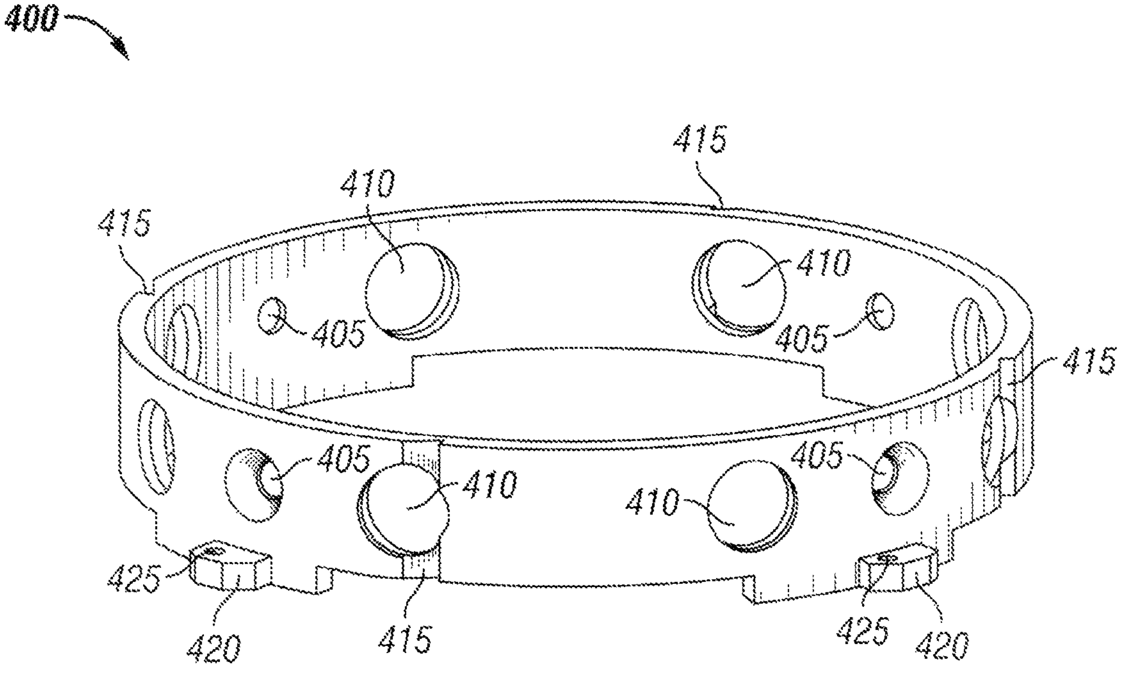
FIG. 4 is a perspective view of a retainer, according to an exemplary embodiment.

FIG. 4 is a perspective view of a retainer 400, according to an exemplary embodiment. The retainer 400 is configured to fit over an exterior of the push sleeve 200 (FIG. 2). The retainer 400 may be coupled to the push sleeve 200 using fastening means (not shown) extending through holes 405 and holes 220 (FIG. 2) of the push sleeve 200. The retainer 400 also includes eight apertures 410 configured to receive alignment members 205, 210 (FIG. 2).

The retainer 400 includes four notches 415 located on alternating apertures 410. The notches 415 are configured to engage corresponding notches on a locking ring (not shown). The retainer 400 also includes four protrusions 420, each having a spring attachment member 425 extending therefrom.

Figure 5:
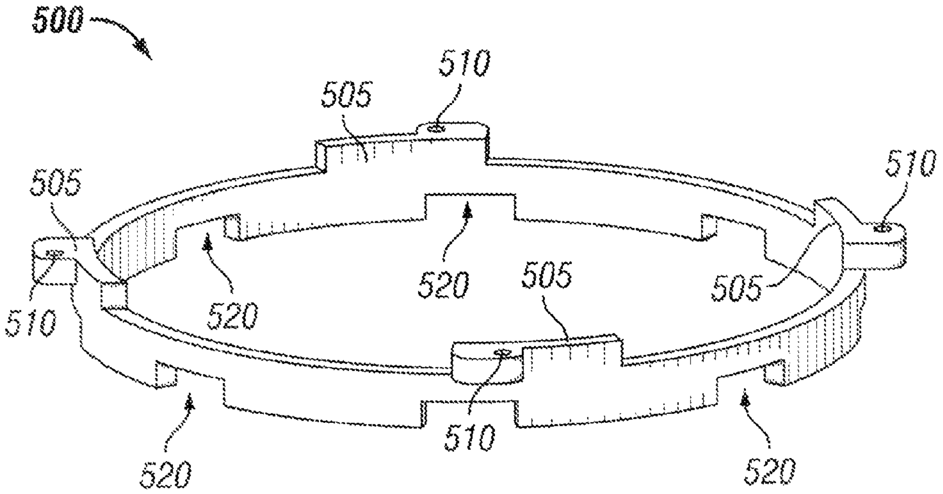
FIG. 5 is a perspective view of a spinner, according to an exemplary embodiment.

FIG. 5 is a perspective view of a circular spinner 500, according to an exemplary embodiment. The spinner 500 includes four protrusions 505, each having a spring attachment member 510 extending therefrom. When the spinner 500 is coupled to the retainer 400 (FIG. 4), each protrusion 505 is positioned in a space between adjacent protrusions 420 (FIG. 4) on the retainer 400. The spinner 500 also includes eight rectangular notches 520 configured to engage a control wheel (not shown).

Figure 6:
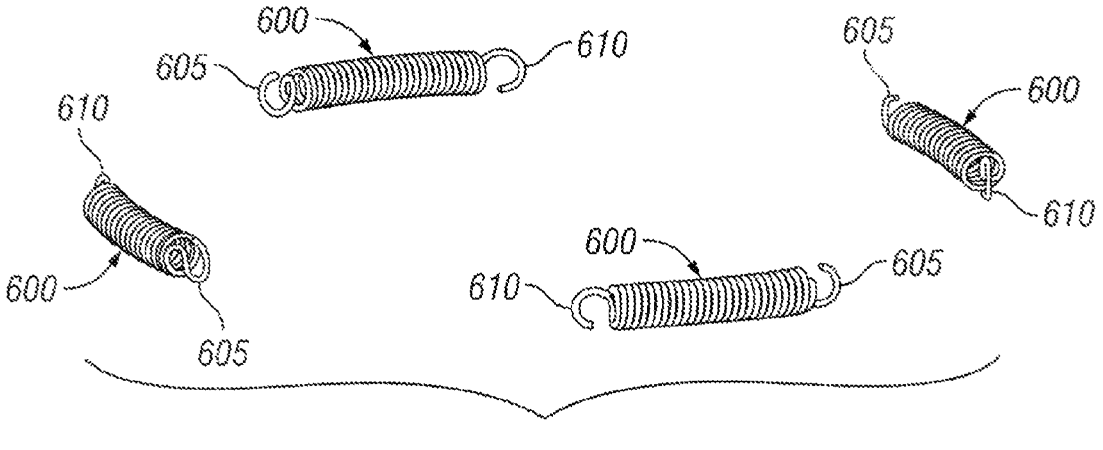
FIG. 6 is a perspective view of a springs, according to an exemplary embodiment.

FIG. 6 is a perspective view of four springs 600, according to an exemplary embodiment. The springs 600 include a first end 605 for attaching to spring attachment members 425 on the retainer 400 (FIG. 4), and a second end 610 for attaching to spring attachment member 510 on the spinner 500 (FIG. 5). The springs 600 are extension springs. In certain alternative embodiments, the springs 600 may be an elastic device.

Figure 7:
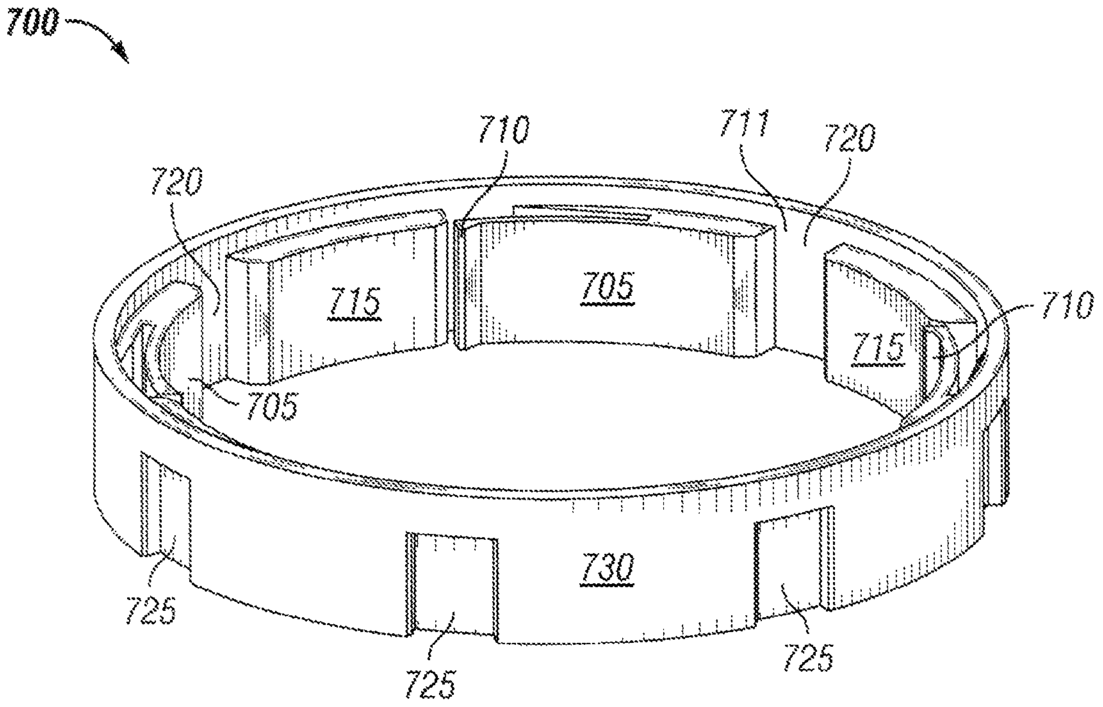
FIG. 7 is a perspective view of a locking ring, according to an exemplary embodiment.

FIG. 7 is a perspective view of a cylindrical locking ring 700, according to an exemplary embodiment. The locking ring 700 may be constructed from plastic, or any other material suitable for flexing service. Suitable materials include, but are not limited to, stainless steel, aluminum, and spring steel. In certain embodiments, non-metallic compounds and metallic materials can be combined to provide the function of the locking ring 700. The locking ring 700 includes four protrusions 705 extending inwardly from an interior surface 711. Each protrusion 705 includes a notch 710 configured to engage notches 415 on the retainer 400 (FIG. 4). The locking ring 700 also includes four protrusions 715, each positioned between two protrusions 705. The protrusions 705, 715 prevent alignment members 205, 210 (FIG. 2) from moving outward from an interior of a receptacle. When the locking ring 700 is rotated, the alignment members 205 are movable into notches 720 positioned between protrusions 705, 715.

The locking ring 700 further includes eight rectangular notches 725 spaced apart along an exterior surface 730. The notches 725 are configured to receive corresponding rectangular protrusions on an interior surface of a control wheel (not shown). One having ordinary skill in the art will recognize that the notches 725 can have any shape for engaging corresponding protrusions on the control wheel. One having ordinary skill in the art also will recognize that any number of notches 725 may be included in the locking ring 700, and corresponding to the number of protrusions on the control wheel.

Figure 8:
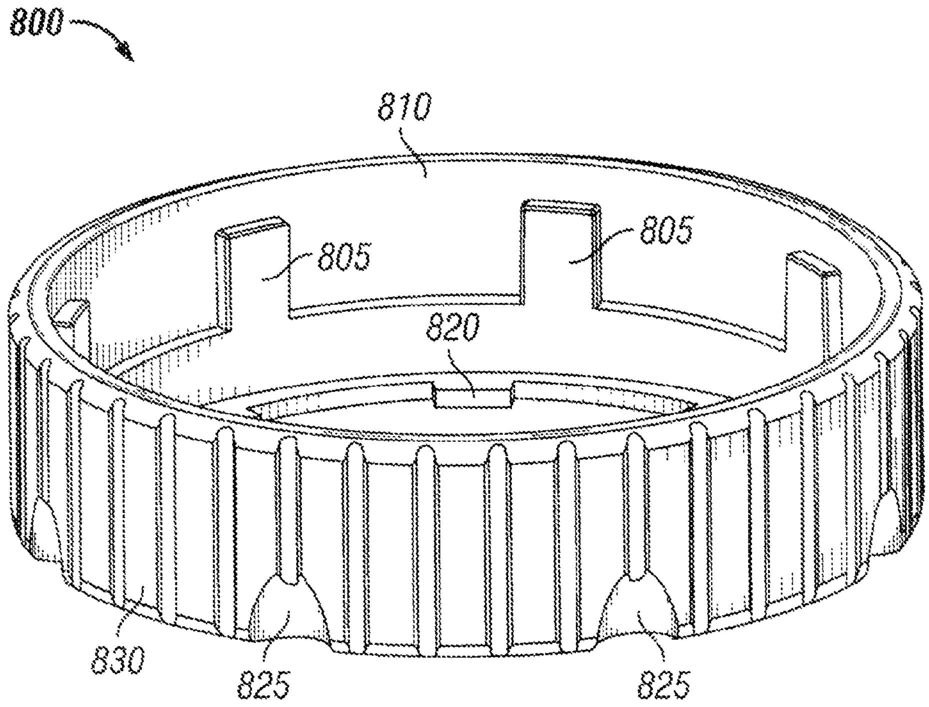
FIG. 8 is a perspective view of a control wheel, according to an exemplary embodiment.

FIG. 8 is a perspective view of a cylindrical control wheel 800, according to an exemplary embodiment. The control wheel 800 can be nonmetallic so as to prevent a user from accidentally being exposed to an electrical spark when engaging the control wheel 800. The control wheel 800 includes eight rectangular protrusions 805 on an interior surface 810. Each protrusion 805 is configured to engage a corresponding notch 725 on the locking ring 700 (FIG. 7). One having ordinary skill in the art will recognize that the protrusions 805 can have any shape for engaging corresponding notches 725 on the locking ring 700. One having ordinary skill in the art also will recognize that any number of protrusions 805 may be included in the control wheel 800, and corresponding to the number of notches 725 on the locking ring 700.

The control wheel 800 further includes eight rectangular protrusions 820 extending inwardly from and orthogonal to the interior surface 810. The protrusions 820 are configured to engage the rectangular notches 520 on the spinner 500 (FIG. 5). One having ordinary skill in the art will recognize that the protrusions 820 can have any shape for engaging corresponding notches 520 on the spinner 500. One having ordinary skill in the art also will recognize that any number of protrusions 820 may be included in the control wheel 800, and corresponding to the number of notches 520 on the spinner 500.

The control wheel 800 also includes eight notches 825 positioned on an end of an exterior surface 830. At least one of the notches 825 align with the bracket 300 (FIG. 3) and engage a lock (not shown) or other device that prevents a user from accidentally rotating the control wheel 800 and unlocking the plug from the receptacle.

Figure 9:
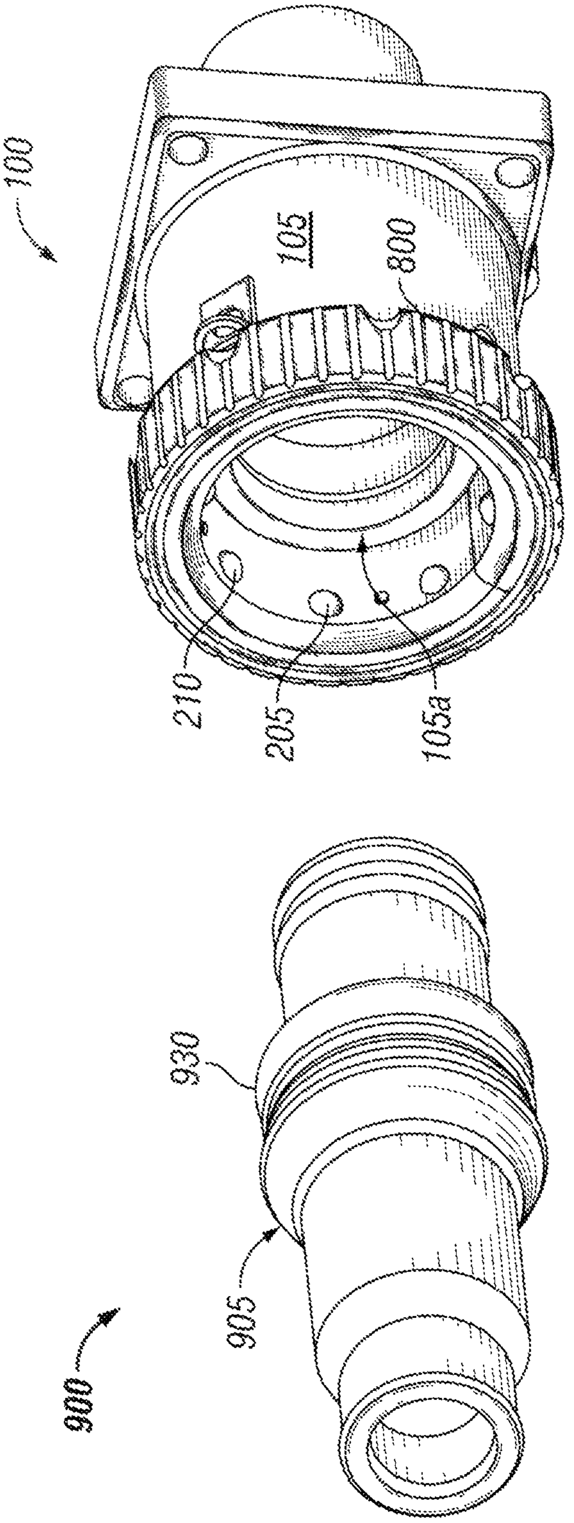
FIG. 9 is a perspective view of a connector, according to an exemplary embodiment.

FIG. 9 is a perspective view of a connector 900. The connector 900 includes a plug 905 and a receptacle 100. The receptacle 100 includes a housing 150 having a cavity 105*a* configured to receive the plug 905. The receptacle 100 includes eight alignment members 205, 210 positioned within the cavity 105*a* and in communication with a control wheel 800. The plug 905 includes a groove 930 configured to engage the alignment members 205, 210 when the plug 905 is inserted into the cavity 105*a* of the receptacle 100. The control wheel 800 locks and unlocks the receptacle 100 to allow insertion and removal of the plug 905, as further described with respect to FIG. 10 below.

Figure 10A:
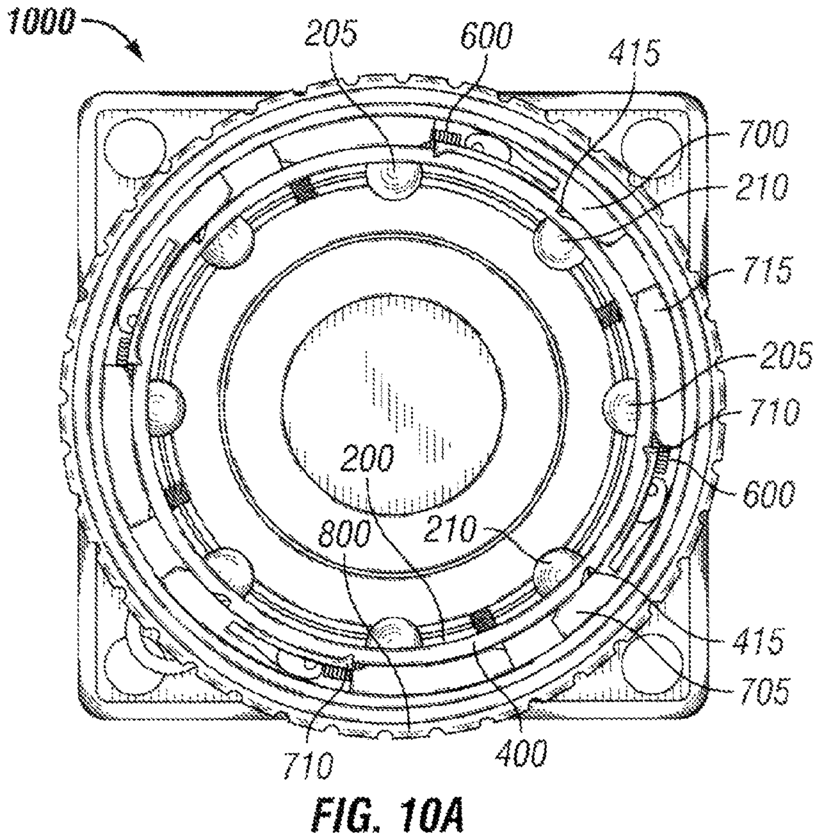
FIG. 10A is a front cross-sectional view of a receptacle, prior to insertion of a plug and in a locked position, according to an exemplary embodiment.
Figure 10B:
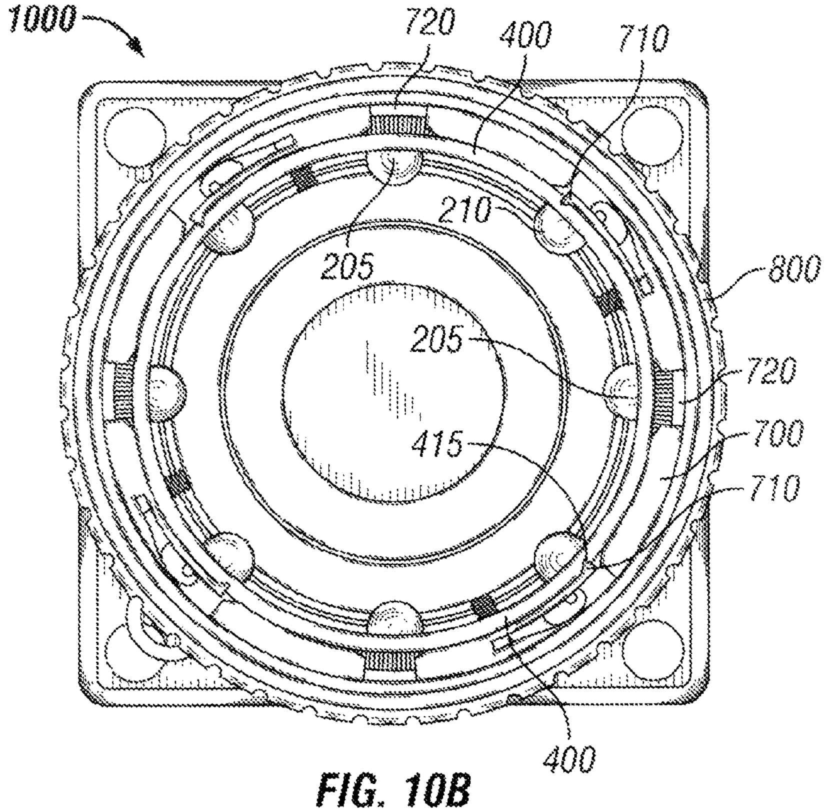
FIG. 10B is a perspective view of the receptacle shown in FIG. 10A, prior to insertion of a plug and in an unlocked position, according to an exemplary embodiment.
Figure 10C:
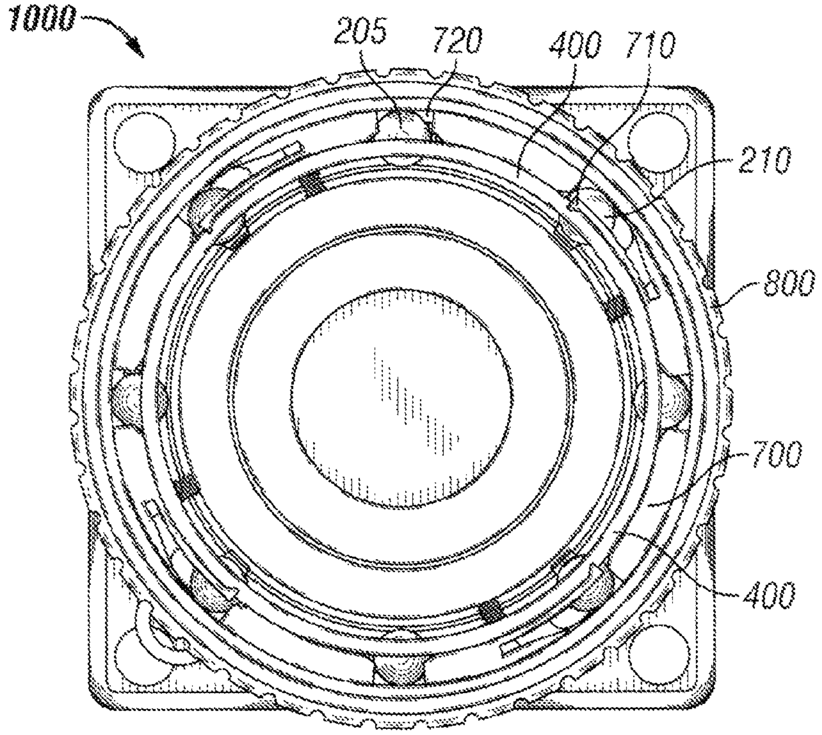
FIG. 10C is a perspective view of the receptacle shown in FIG. 10A, during insertion of a plug and in an unlocked position, according to an exemplary embodiment.

FIG. 10A is a front cross-sectional view of a receptacle 1000, prior to insertion of a plug (not shown) and in a locked position, according to an exemplary embodiment. The receptacle 1000 includes a push sleeve 200 coupled to a retainer 400. The push sleeve 200 includes multiple alignment members 205, 210 positioned within apertures (not shown) in the push sleeve 200. The alignment members 210 are under spring tension from springs 600. The receptacle 1000 further includes a control wheel 800 coupled to an exterior of the push sleeve 200. The control wheel 800 is coupled to a spinner (not shown) and a locking ring 700. The control wheel 800, spinner, and locking ring 700 rotate at least partially about the push sleeve 200 and retainer 400 via springs 600. The control wheel 800 is movable between a first position (FIG. 10A, 10D) and a second position (FIG. 10B, 10C). In the first position, notches 710 on the locking ring 700 are disconnected from notches 415 on the retainer 400, and protrusions 705, 715 prevent alignment members 205, 210 from moving outward. In the first position, the alignment members 205, 210 are biased towards an interior cavity of the receptacle, and prevent a plug from being fully inserted into the receptacle 1000.

FIGS. 10B and 10C are front cross-sectional views of the receptacle 1000, prior to insertion or removal of a plug (not shown) and in an unlocked position, according to an exemplary embodiment. The control wheel 800 (which is coupled to the spinner (not shown) and the locking ring 700) is rotated clockwise one-eighth of a turn and in the second position. In the second position, the notches 710 on the locking ring 700 engage notches 415 on the retainer 400. The engagement of notches 710 with notches 415 aligns notches 720 on the locking ring 700 with the alignment members 205 (FIG. 10B). The alignment of notches 720 with alignment members 205, 210 allow the alignment members 205, 210 to shift outward and retract into the notches 720 upon insertion of a plug (FIG. 10C).

Figure 10D:
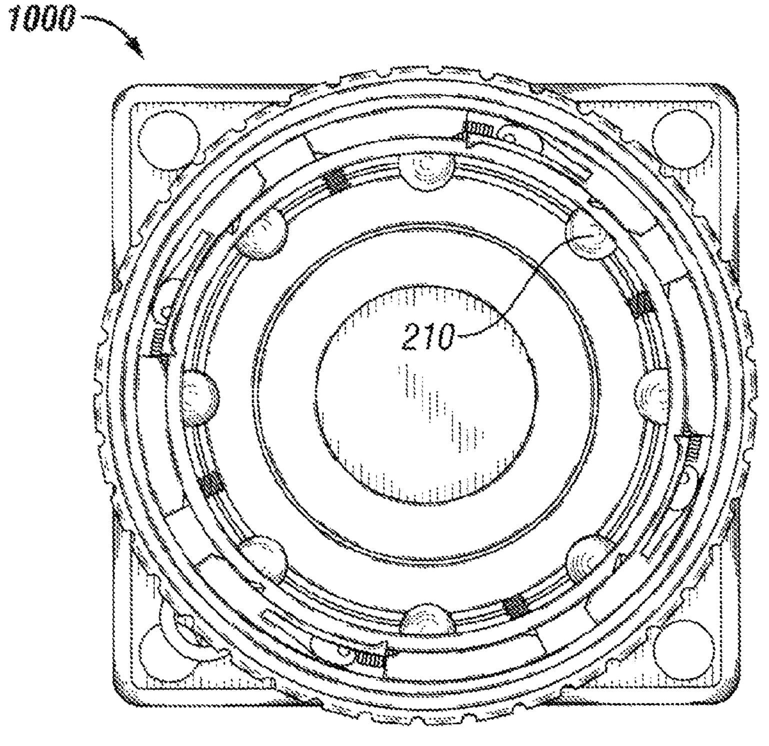
FIG. 10D is a perspective view of the receptacle shown in FIG. 10A, after insertion of a plug and in a locked position, according to an exemplary embodiment.

FIG. 10D is a front cross-sectional view of the receptacle 1000, after insertion of a plug (not shown) and in a locked position, according to an exemplary embodiment. Upon insertion of the plug, the alignment members 210 (which are under spring tension) are automatically pushed towards the plug to engage a groove in the plug and lock the plug in place.

Generally, the components of the locking mechanism on the receptacles of the present invention may be fabricated from any material that is corrosion-resistant. Suitable materials include, but are not limited to, stainless steel, and corrosion-resistant aluminum. The locking mechanisms of the present invention are capable of preventing accidental disengagement of a plug from the receptacle. The inclusion of alignment members in communication with a locking ring and a control wheel allow a user to safely and easily engage and disengage a plug from a receptacle.

Any spatial references herein, such as, for example, “top,” “bottom,” “upper,” “lower,” “above”, “below,” “rear,” “between,” “vertical,” “angular,” “beneath,” etc., are for purpose of illustration only and do not limit the specific orientation or location of the described structure.

Therefore, the invention is well adapted to attain the ends and advantages mentioned as well as those that are inherent therein. The particular embodiments disclosed above are illustrative only, as the invention may be modified and practiced in different but equivalent manners apparent to those having ordinary skill in the art and having the benefit of the teachings herein. For instance, the features of the locking ring may be integrated into the control wheel to form a single control unit. Also, the features of the retainer may be integrated into the push sleeve to form a single sleeve unit. While numerous changes may be made by those having ordinary skill in the art, such changes are encompassed within the spirit and scope of this invention as defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present invention as defined by the claims below. The terms in the claims have their plain, ordinary meaning unless otherwise explicitly and clearly defined by the patentee.

What is claimed is:

1. A receptacle comprising:
- a receptacle housing; and
- a locking mechanism coupled to a plug receiving end of the receptacle housing, the locking mechanism comprising:
  - a sleeve unit having a plurality of openings, a plurality of alignment members, and a plurality of first notches, wherein each alignment member is positioned within each of the plurality of openings, and wherein the plurality of alignment members are movable between a first position and a second position;
  - a control unit rotatably coupled to the sleeve unit and comprising a plurality of second notches and a plurality of protrusions, wherein the control unit is rotatably movable between a locked position and an unlocked position, wherein the plurality of second notches engages the plurality of first notches of the sleeve unit and aligns with each alignment member, allowing movement of the alignment members towards the second position when the control unit is in the unlocked position, and wherein the plurality of second notches is disengaged from the plurality of first notches of the sleeve unit and aligns with each alignment member, biasing the alignment members towards the first position when the control unit is in the locked position; and
- at least one extension member comprising a first end and a second end, wherein the first end is coupled to the control unit, wherein the second end is coupled to the sleeve unit, and wherein the at least one extension member is extended when the control unit is in the unlocked position.

2. The receptacle of claim 1, wherein the sleeve unit comprises a push sleeve coupled to a retainer, wherein the at least one extension member is coupled to the retainer.

3. The receptacle of claim 1, wherein the control unit comprises a spinner, wherein the at least one extension member is coupled to the spinner.

4. The receptacle of claim 1, wherein the control unit comprises a control wheel coupled to a locking ring, wherein the locking ring biases the alignment members towards the first position in the locked position.

5. The receptacle of claim 1, wherein the at least one extension member is an extension spring.

6. The receptacle of claim 1, wherein at least one alignment member is exposed to tension from the at least one extension member in the unlocked position, wherein the tension forces the at least one alignment member towards the first position.

7. The receptacle of claim 1, wherein the control unit comprises at least one third notch, wherein the sleeve unit comprises at least one fourth notch, wherein the at least one third notch engages the at least one fourth notch when the control unit is in the unlocked position.

8. The receptacle of claim 7, wherein the control unit comprises a locking ring, wherein the locking ring comprises the at least one third notch.

9. The receptacle of claim 7, wherein the control unit comprises a control wheel, wherein the control wheel comprises the at least one third notch.

10. The receptacle of claim 7, wherein the sleeve unit comprises a retainer, wherein the retainer comprises the at least one fourth notch.

11. The receptacle of claim 7, wherein the sleeve unit comprises a push sleeve, wherein the push sleeve comprises the at least one fourth notch.

12. A locking mechanism comprising:
- a sleeve unit having a plurality of openings, a plurality of alignment members, and a plurality of first notches, wherein each alignment member is positioned within each of the plurality of openings, and wherein the plurality of alignment members are movable between a first position and a second position;
- a control unit rotatably coupled to the sleeve unit and comprising a plurality of second notches and a plurality of protrusions, wherein the control unit is rotatably movable between a locked position and an unlocked position, wherein the plurality of second notches engages the plurality of first notches of the sleeve unit and aligns with each alignment member, allowing movement of the alignment members towards the second position when the control unit is in the unlocked position, and wherein the plurality of second notches is disengaged from the plurality of first notches of the sleeve unit and aligns with each alignment member, biasing the alignment members towards the first position when the control unit is in the locked position; and
- at least one extension member comprising a first end and a second end, wherein the first end is coupled to the control unit, wherein the second end is couple to the sleeve unit, and wherein the at least one extension member is extended when the control unit is in the unlocked position.

13. The receptacle of claim 12, wherein the sleeve unit comprises a push sleeve coupled to a retainer, wherein the at least one extension member is coupled to the retainer.

14. The receptacle of claim 12, wherein the control unit comprises a spinner, wherein the at least one extension member is coupled to the spinner.

15. The receptacle of claim 12, wherein the control unit comprises a control wheel coupled to a locking ring, wherein the locking ring biases the alignment members towards the first position in the locked position.

16. The receptacle of claim 12, wherein the at least one extension member is an extension spring.

17. The receptacle of claim 12, wherein at least one alignment member is exposed to tension from the at least one extension member in the unlocked position, wherein the tension forces the at least one alignment member towards the first position.

18. The receptacle of claim 12, wherein the control unit comprises at least one third notch, wherein the sleeve unit comprises at least one fourth notch, wherein the at least one third notch engages the at least one fourth notch when the control unit is in the unlocked position.

19. The receptacle of claim 18, wherein the control unit comprises a locking ring, wherein the locking ring comprises the at least one third notch.

20. The receptacle of claim 18, wherein the sleeve unit comprises a retainer, wherein the retainer comprises the at least one fourth notch.

* * * * *